Sept. 27, 1932.  L. H. CHURCH  1,879,920
BOX CONNECTER
Filed April 16, 1929
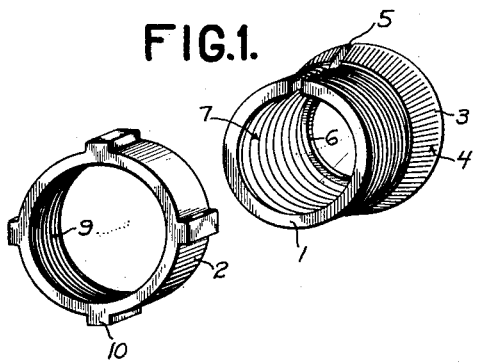
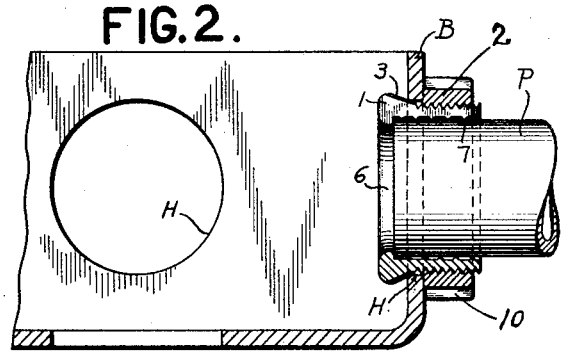
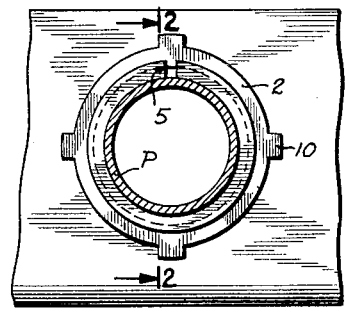
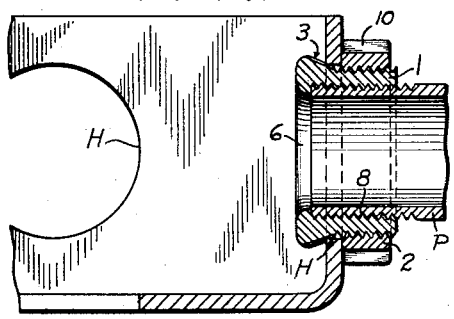
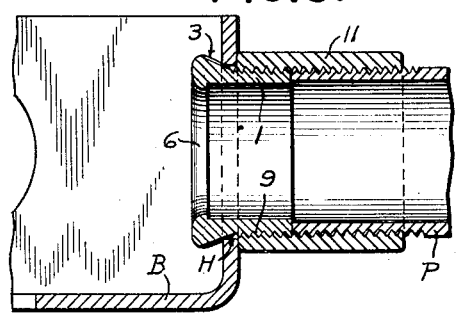
Inventor
LEWIS H. CHURCH
By his Attorneys
Bohleber & Ledbetter Patented Sept. 27, 1932

1,879,920

UNITED STATES PATENT OFFICE

LEWIS H. CHURCH, OF WESTFIELD, NEW JERSEY, ASSIGNOR TO THE THOMAS & BETTS CO., OF ELIZABETH, NEW JERSEY, A CORPORATION OF NEW JERSEY

BOX CONNECTER

Application filed April 16, 1929. Serial No. 355,596.

This invention relates to box connecters used in electrical house wiring systems in which a terminal box is provided to which the electrical wires are carried usually through metallic conduits. The walls of the terminal box are provided with holes in which the connecter is inserted to anchor the metallic conduit and the connecter to the box hole opening and enabling the wires carried by the conduit to be brought to the interior of the box.

An object of the invention is to provide a simple box connecter which effects a rigid and secure connection between the box and the conduit which is obtained by utilizing a conical seat for the connecter which is firmly wedged into the box hole opening by an operating means and the conduit is then firmly attached to the connecter either by the single operation of anchoring the connecter within the box hole opening or by some other means acting separately. The invention also contemplates the box assembly in which the connecter and box form a new combination.

Another object of the invention is to produce a connecter which engages and holds a conduit pipe firmly within the connecter without the necesity of threading the end of the pipe.

Another object of this invention is to provide a box connecter which has a minimum number of parts and which is easily and quickly assembled and still secures a firm and rigid anchorage of the conduit pipe within the terminal box.

Other objects of the invention will be apparent from the following description and drawing of a connecter which accomplishes the objects enumerated above and the preferred embodiment of which is shown in the drawing in which:—

Figure 1 is a perspective view of the two parts which comprise the connecter.

Figure 2 is a section through the connecter as it is assembled within a terminal box a portion of which is shown also in section and with a pipe firmly gripped within the connecter.

Figure 3 is a view showing the connecter assembled in a box hole and showing a portion of the box as viewed from the outside of the box and looking directly at the connecter.

Figure 4 is a section through the connecter assembled in a box hole, a portion of the box being shown in section, in which the pipe is secured therein by threading the end of the pipe and screwing it into the connecter.

Figure 5 is a section of the box connecter assembled in a box hole, a portion of the box being shown in section in which a threaded pipe is secured to the connecter in a manner different from that shown in Figure 4.

The box connecter of my invention obtains its firm anchorage within a box hole by utilizing the wedging action of a conical surface which conical surface is brought into firm and secure contact with the edges of the box hole by an operating means which draws the connecter axially with respect to the box. In case it is desired to grip a pipe end in the connecter without the necessity of threading the end of the pipe, the connecter is made contractible so that as it contracts it decreases the inner circumference and grips the end of the pipe inserted within the connecter. In such case the conical means not only serves as a wedging means to firmly anchor the connecter within the box hole but also serves to contract the connecter to grip the pipe end. The invention is not limited, however, to the form in which the pipe is anchored by contraction of the connecter and therefore if it is desired to connect the pipe end to the connecter by threading the end of the pipe and screwing it into the connecter this may be accomplished in various ways.

Referring to Figure 1 of the drawing, the connecter is shown to consist of a member 1 in sleeve form and having a conical portion or seat, the angularity of which is preferably relatively large to engage the box hole edge, and an operating member which enforces axial movement of the sleeve. The preferred form of operating means is a nut 2 which engages the threaded portion of the sleeve and abuts against the box wall to draw the conical portion of the sleeve within the box hole and wedge it therein. The conical portion may have grooves 4 running longitudinally on the surface to bite into the metal of the box hole to prevent turning of the sleeve in the box hole and to give the conical surface a firm grip therein. In case it is desired to grip the pipe without threading it which is secured by contracting the connecter, a slot 5 renders the connecter flexible or contractible which slot extends longitudinally of the connecter sleeve. The interior of the sleeve is of such diameter that it will freely permit the end of a pipe P to be inserted therein. A shoulder 6 within the sleeve serves as a stop against which the end of the pipe abuts when it is inserted within the coupler. The shoulder 6 is shown at the end of the sleeve although it may be positioned elsewhere within the sleeve so long as sufficient length of pipe may be inserted into the sleeve to secure a firm grip on the pipe.

If an unthreaded pipe is to be anchored within the connecter, the ridges 7 grip the pipe end within the connecter sleeve when it is contracted by the action of the conical surface being drawn into the box hole by the operating nut. The ridges 7 may be spirally formed or may be merely circular or may take any other form to securely anchor the pipe end therein. The gripping ridges 7 bite into the wall of the pipe when the connecter sleeve is contracted and in that manner cuts through any paint, grease, or insulating substance which may be upon the surface of the pipe and establishes a good electrical contact between the connecter and the pipe. If it is desired to thread the end of the pipe then the interior of the sleeve 1 may be threaded as at 8 and if the pipe is so threaded into the connecter there is no need for a flexible or contractible sleeve and therefore in such case the slot may be omitted.

The preferred operating means is a nut 2 having interior threads 9 which engage with the threads on the sleeve. The projections 10 about the outer circumference of the nut, four of which are shown, enable a firm grip to be secured on the nut with a wrench or other tool or even with the hand for preliminary tightening or running up of the nut on the sleeve.

There is another manner in which a pipe having a threaded end may be secured to the connecter. This method is shown in Figure 5 in which the sleeve is of the same form as in Figure 4 and does not have the slot shown in Figures 1 and 2. In this form the nut 11 is long and engages with the threads on the sleeve and projects beyond the end of the connecter. The entire inner length of the nut is threaded so that there is a substantial length of the nut carrying screw threads extending beyond the connecter sleeve. This threaded extension of the elongated nut serves as the screw thread to be engaged by the threaded end of the pipe.

The connecter is assembled by inserting the connecter sleeve within the box hole opening H until the conical surface 3 engages with the edge of the box hole opening. The nut 2 is threaded upon the sleeve without attempting to wedge the conical portion of the sleeve within the hole. Where it is desired to anchor a pipe which is unthreaded at its end, the pipe end is inserted within the end of the sleeve of the slotted form shown in Figures 1 and 2 until it abuts against the shoulder 6. The nut 2 is then screwed tightly up against the box wall which draws the conical wedging surface 3 of the sleeve into the box hole opening and contracts the sleeve about the end of the pipe so that the ridges 7 bite into the surface of the pipe and securely anchor it therein. The contracting of the sleeve to grip the pipe within the sleeve also wedges the conical surface firmly into the box hole opening. With the nut tightly screwed against the box wall the connecter sleeve cannot release the pipe nor can the conical surface on the sleeve release itself from its wedging position within the box hole.

In the form of construction shown in Figure 4 the sleeve is inserted within the box hole opening H and the nut 2 screwed on the sleeve and tightened against the box wall until the conical surface 3 is securely wedged within the box hole opening. The pipe P is then threaded within the connecter until it abuts the shoulder 6 which securely holds the pipe within the connecter and the connecter is securely wedged within the box hole opening.

In the form shown in Figure 5 the sleeve is inserted within the box hole opening H and the nut 11 is threaded onto the sleeve and tightened until the connecter is firmly anchored within the box hole opening. The pipe P is then threaded within the long nut 11 until its end abuts the end of the sleeve 1 and the pipe is firmly secured to the connecter which connecter is securely anchored within the box hole opening.

The ridges 4 provided upon the outer conical surface 3 serve as gripping teeth and bite into the edge of the box hole opening as the conical surface is wedged therein. These ridges serve to establish a good electrical contact between the box and the connecter and in addition they prevent rotation of the sleeve within the box hole opening as the nut is tightened up.

It will be seen therefore that with my box connecter I have produced a construction by which a good electrical contact is established between the box and the connecter and between the connecter and the conduit pipe which assures thorough electrical grounding of the box and pipe. In addition the connecter and pipe are firmly anchored within the box hole opening which firm anchorage is secured with two members namely the connecter sleeve and the nut which parts are quickly assembled.

What I claim is:—

1. A box connecter to be inserted in a box hole comprising a sleeve, conical wedging means on said sleeve, the angularity of the cone being relatively large to engage the box hole edge, closely spaced axial knurling grooves having pointed ridges on the conical wedging means, operating means to pull the connecter axially in the box hole and anchor said wedging means against the box hole edge, and means to secure a pipe thereto.

2. A box connecter to be inserted in a box hole comprising a contractible sleeve, conical wedging means on said sleeve, the angularity of the cone being relatively large to engage the box hole edge, closely spaced axial knurling grooves forming pointed ridges on the conical wedging means, operating means to pull the connecter axially in the box hole and anchor the wedging means against the box hole edge and contract the sleeve to secure a pipe therein.

3. A box connecter to be inserted in a box hole comprising a contractible sleeve, conical wedging means on said sleeve, the angularity of the cone being relatively large to engage the box hole edge, closely spaced axial knurling grooves forming pointed ridges on the conical wedging means, screw threads on said sleeve, a nut engaging the screw threads to pull the connecter axially in the box hole and anchor the conical wedging means against the box hole edge and contract the sleeve to secure a pipe therein.

4. A box connecter to be inserted in a box hole comprising a sleeve having a slot extending longitudinally thereof for the full length of the sleeve, a conical seat on said sleeve, closely spaced knurling grooves forming pointed ridges upon said conical seat extending longitudinally of the cone, the angularity of the cone being relatively large to engage the box hole edge, projections within the sleeve, screw threads on the sleeve, and a nut engaging the screw threads to pull the connecter axially in the box hole and anchor the conical seat of the sleeve against the box hole edge and to contract the sleeve to grip a pipe therein.

In testimony whereof I affix my signature.

LEWIS H. CHURCH.